(12) United States Patent
Muramatsu

(10) Patent No.: US 7,880,786 B2
(45) Date of Patent: Feb. 1, 2011

(54) SOLID-STATE IMAGE PICKUP DEVICE WITH AN IMPROVED READING SPEED

(75) Inventor: Yoshinori Muramatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 834 days.

(21) Appl. No.: 11/106,843

(22) Filed: Apr. 15, 2005

(65) Prior Publication Data

US 2005/0237408 A1 Oct. 27, 2005

(30) Foreign Application Priority Data

Apr. 23, 2004 (JP) .......................... P2004-127711

(51) Int. Cl.
H04N 5/335 (2006.01)

(52) U.S. Cl. ........................ 348/302; 348/294; 348/300; 348/301

(58) Field of Classification Search .................. 348/302
See application file for complete search history.

(56) References Cited

U.S. PATENT DOCUMENTS

| | | | | |
|---|---|---|---|---|
| 4,314,279 | A * | 2/1982 | Yoshida | 348/316 |
| 4,453,177 | A * | 6/1984 | Berger et al. | 348/282 |
| 4,528,595 | A * | 7/1985 | Eouzan | 348/305 |
| 4,945,242 | A | 7/1990 | Berger et al. | |
| 6,466,265 | B1 * | 10/2002 | Lee et al. | 348/308 |
| 6,956,605 | B1 * | 10/2005 | Hashimoto | 348/301 |
| 7,079,184 | B2 * | 7/2006 | Yanai | 348/319 |
| 7,488,928 | B2 * | 2/2009 | Krymski | 250/208.1 |
| 2002/0186312 | A1 * | 12/2002 | Stark | 348/302 |
| 2004/0159861 | A1 * | 8/2004 | Mori et al. | 257/223 |

FOREIGN PATENT DOCUMENTS

| | | |
|---|---|---|
| EP | 1 351 484 | 10/2003 |
| JP | 60-149268 | 8/1985 |
| JP | 60-154784 | 8/1985 |
| JP | 03-187584 | 8/1991 |
| JP | 06-113215 | 4/1994 |
| JP | 08-111821 | 4/1996 |
| JP | 09-046480 | 2/1997 |
| JP | 2000-152262 | 5/2000 |
| JP | 2002-033963 | 1/2002 |
| WO | WO 2004/034697 | 4/2004 |

OTHER PUBLICATIONS

European Search Report dated Mar. 14, 2006.
A Japanese Office Action dated Jun. 18, 2009 issued in connection with counterpart Japanese Patent Application No. 2004-127711.

* cited by examiner

*Primary Examiner*—Jason Chan
*Assistant Examiner*—Cynthia Calderon
(74) *Attorney, Agent, or Firm*—SNR Denton US LLP

(57) ABSTRACT

A CMOS color image sensor, which is a solid-state image pickup device, includes a plurality of pixels arranged in a matrix having a plurality of rows and a plurality of columns, each of the plurality of pixels converting the incident light intensity into an electrical signal; a pixel array including the plurality of pixels; row-selection lines; and column-reading lines. Two column-reading lines are provided for each column of the pixel array. Pixels in even rows of each column are connected to one column-reading line and pixels in odd rows of each column are connected to the other column-reading line.

7 Claims, 5 Drawing Sheets

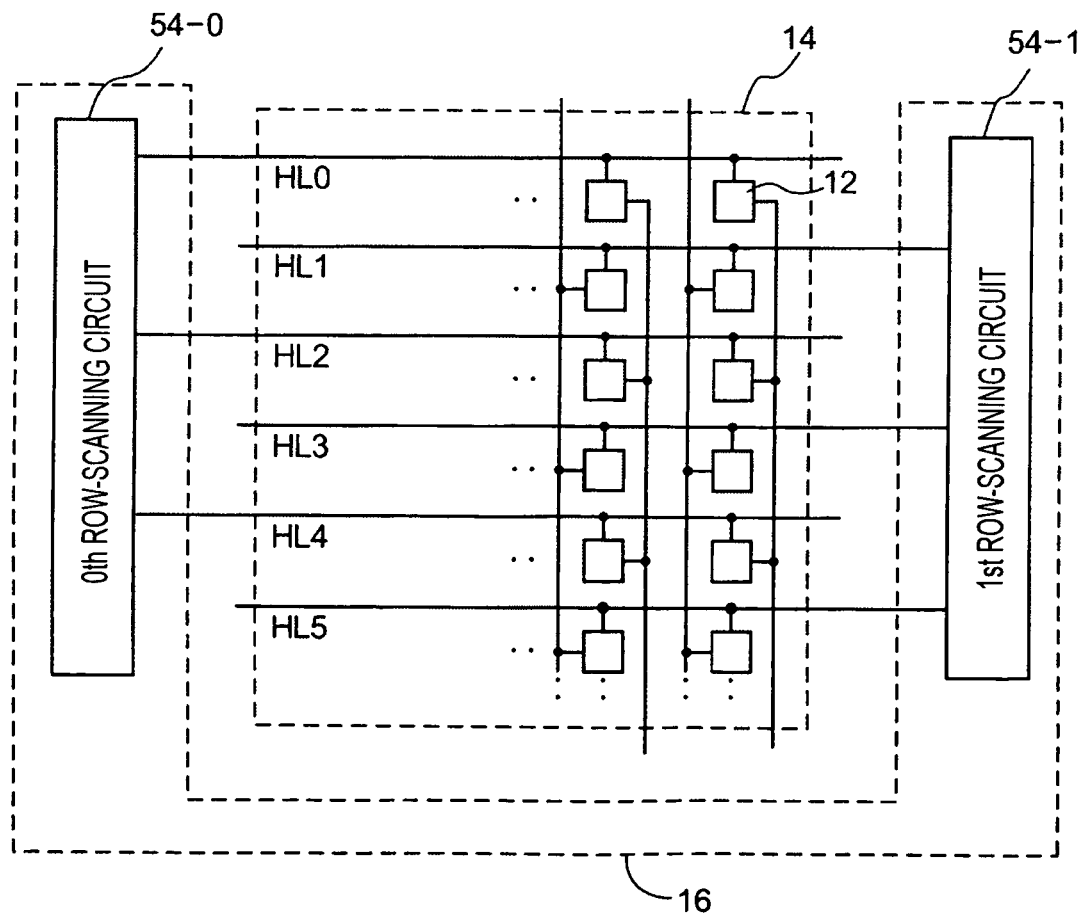

SOLID-STATE IMAGE PICKUP DEVICE WITH AN IMPROVED READING SPEED

RELATED APPLICATION DATA

The present application claims priority to Japanese Application(s) No(s). P2004-127711 filed Apr. 23, 2004, which application(s) is/are incorporated herein by reference to the extent permitted by law.

BACKGROUND OF THE INVENTION

1. Field of the Invention

The present invention relates to solid-state image pickup devices, such as complementary metal-oxide semiconductor (CMOS) image sensors.

2. Description of the Related Art

Solid-state image pickup devices are used for the purpose of recording images and for various other purposes, such as image recognition. In particular, when a solid-state image pickup device is used as an image sensor for image recognition of a moving object, output signals of two consecutive frames are compared with each other so that the direction and speed of the moving object in the frames are recognized. Since an object moving at very high speed may pass through the field of view of a solid-state image pickup device and disappear from the field of view in a moment, the moving object must be captured in at least two frames in a fraction of a second. In this case, high-speed frame reading (high frame rate) is required for the solid-state image pickup device. A solid-state image pickup device for detecting the movement of a moving object is described, for example, in Japanese Unexamined Patent Application Publication No. 11-8805.

Although various procedures for increasing the frame reading speed have been suggested, a further increase in the frame reading speed is strongly desired.

SUMMARY OF THE INVENTION

A solid-state image pickup device according to the present invention includes a plurality of pixels arranged in a matrix having a plurality of rows and a plurality of columns, each of the plurality of pixels converting an incident light intensity into an electrical signal; a pixel array including the plurality of pixels; a plurality of row-selection lines each provided for each row of the pixel array and each connected to all the pixels in the corresponding row; a row-selection control unit for selectively activating the plurality of row-selection lines; a plurality of column-reading lines, n column-reading lines from a 0th column-reading line to an (n−1)th column-reading line being provided for each column of the pixel array; and a column-scanning unit for performing column scanning by selectively activating the plurality of column-reading lines. Each of the plurality of pixels in each column of the pixel array is connected to one of the n column-reading lines that correspond to the column. A pixel in a (k+m)th row of each column is connected to an mth column-reading line, where k represents a positive integer and m represents an integer from 0 to n−1. The column-scanning unit includes n column-scanning circuits from a 0th column-scanning circuit to an (n−1)th column-scanning circuit. An mth column-reading line from among the n column-reading lines that correspond to each column of the pixel array is connected to an mth column-scanning circuit, where m represents an integer from 0 to n−1.

Also, a solid-state image pickup device according to the present invention includes a plurality of pixels arranged in a matrix having a plurality of rows and a plurality of columns, each of the plurality of pixels converting an incident light intensity into an electrical signal; a pixel array including the plurality of pixels; a plurality of row-selection lines each provided for each row of the pixel array and each connected to all the pixels in the corresponding row; a row-selection control unit for selectively activating the plurality of row-selection lines; a plurality of column-reading lines, n column-reading lines from a 0th column-reading line to an (n−1)th column-reading line being provided for each column of the pixel array; and a column-scanning unit for performing column scanning by selectively activating the plurality of column-reading lines. Each of the plurality of pixels in each column of the pixel array is connected to one of the n column-reading lines that correspond to the column. A pixel in a (k+m)th row of each column is connected to an mth column-reading line, where k represents an integer of {0, n, 2n, 3n, ...} and m represents an integer from 0 to n−1. The column-scanning unit includes n column-scanning circuits from a 0th column-scanning circuit to an (n−1)th column-scanning circuit. An mth column-reading line from among the n column-reading lines that correspond to each column of the pixel array is connected to an mth column-scanning circuit, where m represents an integer from 0 to n−1.

BRIEF DESCRIPTION OF THE DRAWINGS

FIG. 4 is a schematic diagram showing a specific example of a preferred arrangement of color filters when the row-selection control unit shown in FIG. 3 is used;

FIG. 5 is a block diagram showing a second example of the structure of the row-selection control unit used in the CMOS color image sensor shown in FIG. 1;

DESCRIPTION OF THE PREFERRED EMBODIMENTS

Embodiments of the present invention will be described with reference to the drawings.

Figure 1:
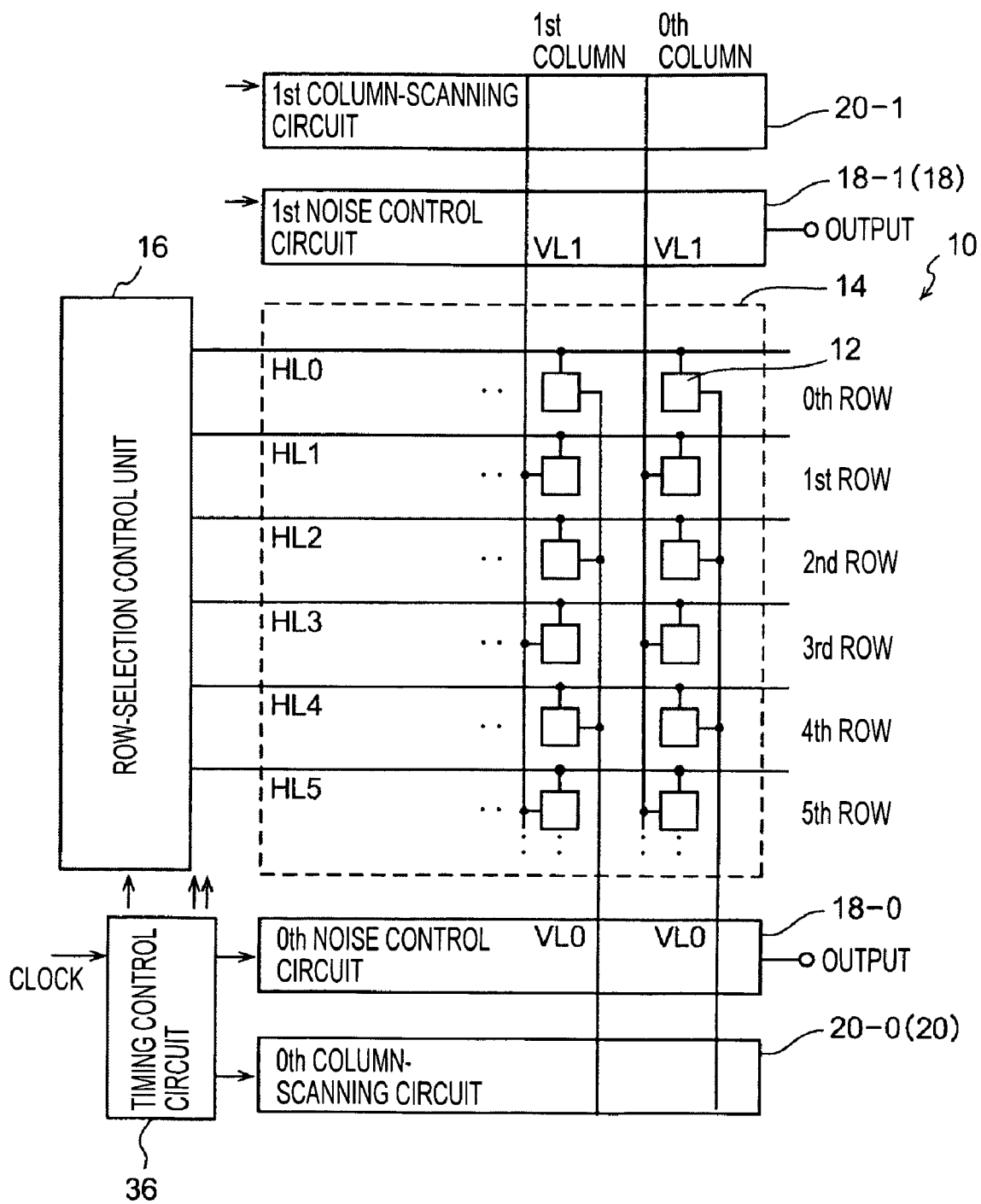
FIG. 1 is a block diagram showing the structure of a CMOS color image sensor according to a preferred embodiment of the present invention.

FIG. 1 is a block diagram showing the structure of a solid-state image pickup device, which is a CMOS color image sensor 10, according to a preferred embodiment of the present invention. The image sensor 10 includes a plurality of pixels 12 each converting the incident light intensity into an electrical signal. The pixels 12 are arranged in a matrix having a plurality of rows and a plurality of columns and constitute a pixel array 14. Generally, the pixel array 14 includes dozens, hundreds, or thousands of rows and columns. In FIG. 1, however, for the purpose of explaining the structure of the image sensor 10, only the 0th and 1st columns from among the plurality of columns and only pixels in the 0th to 5th rows of the 0th and 1st columns from among the plurality of pixels are shown.

The image sensor 10 includes a plurality of row-selection lines, that is, a 0th row-selection line HL0, a 1st row-selection line HL1, a 2nd row-selection line HL2, a 3rd row-selection line HL3, a 4th row-selection line HL4, and a 5th row-selection line HL5, provided for corresponding rows of the pixel array 14. The 0th row-selection line HL0 corresponds to the 0th row of the pixel array 14 and is connected to all the pixels in the 0th row. Similarly, the other row-selection lines are connected to all the pixels in the corresponding rows. The row-selection lines HL0 to HL5 are connected to a row-selection control unit 16 for selectively activating the row-selection lines HL0 to HL5.

The image sensor 10 includes a plurality of column-reading lines. In the present invention, two column-reading lines are provided for each column of the pixel array 14, unlike known image sensors in which only one column-reading line is provided for each column of a pixel array. As is described below, the number of column-reading lines provided for each column is not necessarily limited to two. Three or more column-reading lines may be provided for each column. In the image sensor 10 shown in FIG. 1, a 0th column-reading line VL0 and a 1st column-reading line VL1 are provided for each column.

Each of the pixels 12 in each column of the pixel array 14 is connected to one of the 0th column-reading line VL0 and the 1st column-reading line VL1 that correspond to the column. In particular, in FIG. 1, pixels in even rows (the 0th row, the 2nd row, and so on) of each column are connected to the 0th column-reading line VL0 and pixels in odd rows (the 1st row, the 3rd row, and so on) of each column are connected to the 1st column-reading line VL1. The plurality of column-reading lines of the pixel array 14 is connected via a noise control unit 18 to a column-scanning unit 20 for performing column scanning by selectively activating the plurality of column-reading lines.

The noise control unit 18 eliminates noise components from signals read from the pixels 12 via the 0th column-reading line VL0 or the 1st column-reading line VL1 under the control of the column-scanning unit 20, and outputs signals whose noise components are eliminated. In the example shown in FIG. 1, the noise control unit 18 includes two noise control circuits, that is, a 0th noise control circuit 18-0 and a 1st noise control circuit 18-1.

The column-scanning unit 20 includes two column-scanning circuits, that is, a 0th column-scanning circuit 20-0 and a 1st column-scanning circuit 20-1. The 0th column-reading line VL0, from among the two column-reading lines provided for each column of the pixel array 14, is connected to the 0th column-scanning circuit 20-0 via the 0th noise control circuit 18-0. The 1st column-reading line VL1, from among the two column-reading lines provided for each column of the pixel array 14, is connected to the 1st column-scanning circuit 20-1 via the 1st noise control circuit 18-1.

Figure 2:
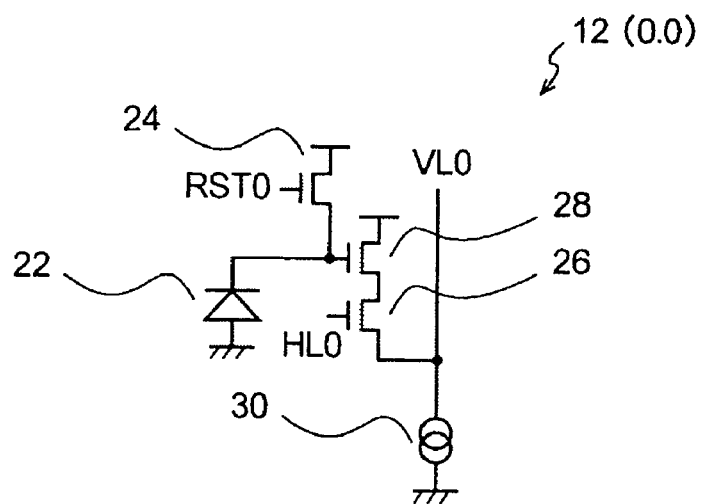
FIG. 2 is a circuit diagram showing a pixel and a column-reading line of the CMOS color image sensor shown in FIG. 1.

FIG. 2 is a circuit diagram showing the detailed structure of a pixel and a column-reading line of the CMOS color image sensor shown in FIG. 1. Although the pixel 12 (0,0) shown in FIG. 2 is located in the 0th row and 0th column, this structure also applies to the other pixels of the pixel array 14. As shown in FIG. 2, the pixel 12 (0,0) includes a photodiode 22, a reset transistor 24 whose gate is connected to a reset line RST0, a select transistor 26 whose gate is connected to the 0th row-selection line HL0, and an amplifying transistor 28. A signal that is photo-electrically converted at the photodiode 22 and that is subjected to storage time control by the reset transistor 24 is input to the gate of the amplifying transistor 28. The source of the amplifying transistor 28 is connected to the 0th column-reading line VL0 via the select transistor 26. The 0th column-reading line VL0 is connected to a current source 30. The current source 30 and the amplifying transistor 28 constitute a source-follower amplifier. Only when the row-selection control unit 16 activates the 0th row-selection line HL0, which corresponds to the 0th row of the pixel array 14, and the 0th column-scanning circuit 20-0 activates the 0th column-reading line VL0 from among the 0th column-reading line VL0 and the 1st column-reading line VL1 that correspond to the 0th column, a signal of the pixel 12 (0,0) in the 0th row and the 0th column is read to the corresponding column-reading line (that is, the 0th column-reading line VL0 in the 0th column) by the source-follower amplifier.

The operation timing of each of the row-selection control unit 16, the 0th noise control circuit 18-0 and the 1st noise control circuit 18-1 of the noise control unit 18, and the 0th column-scanning circuit 20-0 and the 1st column-scanning circuit 20-1 of the column-scanning unit 20 is controlled by a timing control circuit 36 in accordance with an external clock. The image sensor 10 further includes an amplifier, an analog-to-digital conversion circuit, and various signal processing circuits. However, since they do not directly pertain to the present invention, they are not shown in the drawing, and the descriptions thereof are omitted.

The row-selection control unit 16 performs row scanning by sequentially activating a plurality of row-selection lines of the image sensor 10. However, the row-scanning procedure is different from row-scanning procedures of known image sensors. In addition, the image sensor 10 is capable of adopting various row-scanning procedures. The operation and advantages of the image sensor 10 differ depending on the row-scanning procedure adopted. Specific examples of some row-scanning procedures are described next.

In a first row-scanning procedure, row selection is performed by activating two row-selection lines at the same time. In this procedure, for example, the row-selection control unit 16 activates the 0th row-selection line HL0, which corresponds to the 0th row of the pixel array 14, and the 1st row-selection line HL1, which corresponds to the 1st row of the pixel array 14, at the same time. In this state, the 0th column-scanning circuit 20-0 and the 1st column-scanning circuit 20-1 are operated in synchronization with each other so that column scanning is performed for the 0th row and the 1st row. Signals read from a plurality of pixels in the 0th row are sequentially output from the 0th noise control circuit 18-0, and at the same time, signals read from a plurality of pixels in the 1st row are sequentially output from the 1st noise control circuit 18-1.

After column scanning for the 0th row and the 1st row is completed and signals of all the pixels in the 0th row and the 1st row are read, the row-selection control unit 16 activates the 2nd row-selection line HL2, which corresponds to the 2nd row, and the 3rd row-selection line HL3, which corresponds to the 3rd row, at the same time. In this state, the 0th column-scanning circuit 20-0 and the 1st column-scanning circuit 20-1 are operated in synchronization with each other so that column scanning is performed for the 2nd row and the 3rd row. Thus, column scanning for the 2nd row and column scanning for the 3rd row can be performed in parallel. Similarly, row scanning is performed by sequentially activating two row-selection lines. When the row scanning is completed, a frame reading operation is completed.

According to the first row-scanning procedure, signals of pixels in two rows corresponding to two row-selection lines activated at the same time are read in parallel by two column-scanning circuits, that is, the 0th column-scanning circuit 20-0 and the 1st column-scanning circuit 20-1. Thus, the frame reading speed can be increased to double that of known row-scanning procedures.

Figure 3:
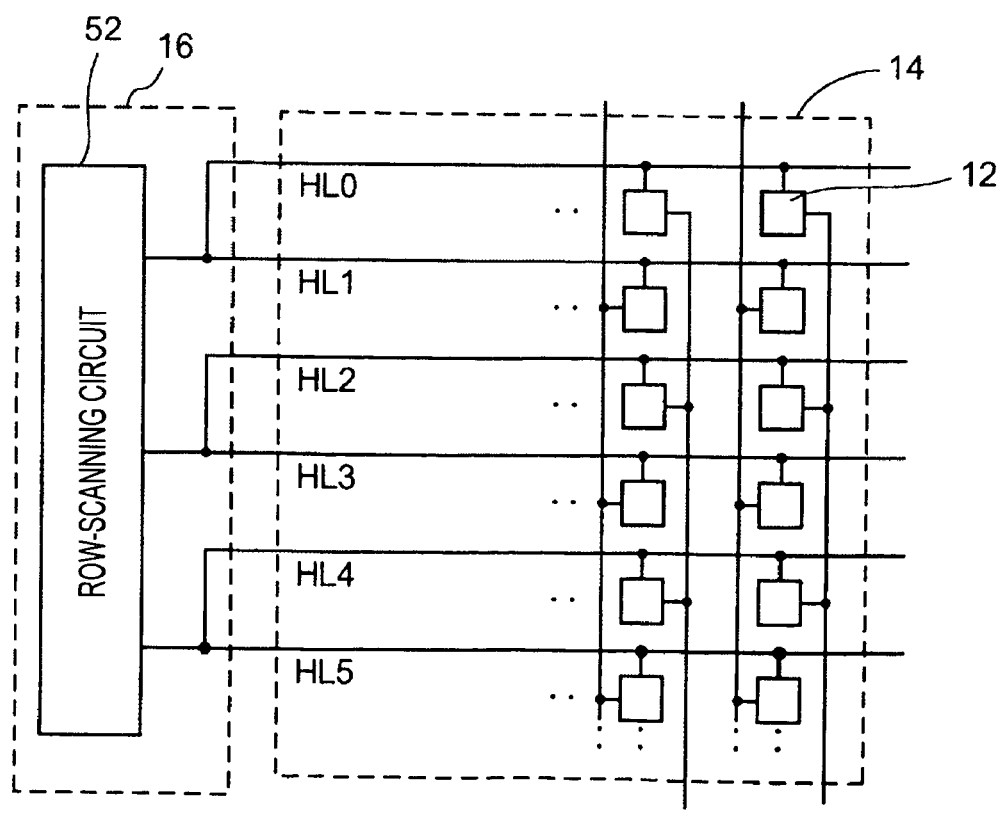
FIG. 3 is a block diagram showing a first example of the structure of a row-selection control unit used in the CMOS color image sensor shown in FIG. 1.

FIG. 3 is a block diagram showing a first example of the structure of the row-selection control unit 16 for performing the first row-scanning procedure used in the image sensor 10 shown in FIG. 1. As shown in FIG. 3, the row-selection control unit 16 includes a row-scanning circuit 52. Each of a plurality of output lines of the row-scanning circuit 52 is divided into two, and the two divided output lines are connected to two row-selection lines to be activated at the same time. With this structure, a row-selection control unit capable of performing the first row-scanning procedure can be achieved. The row-scanning circuit 52 itself may be similar to a row-scanning circuit used in known image sensors.

FIG. 4 is a schematic diagram showing a specific example of a preferred arrangement of color filters when the row-selection control unit 16 shown in FIG. 3 adopting the first row-scanning procedure is used. In the image sensor 10, which is a color image sensor, each of the plurality of pixels 12 includes a red (R), blue (B), or green (G) color filter. Signal processing, such as color interpolation, is performed on signals obtained from the pixels 12 in the subsequent stage to generate a color image. When the first row-scanning procedure is used, it is preferable that the color filters in three colors be arranged such that R and G are alternately aligned in even rows (the 0th row, the 2nd row, and so on) and that G and B are alternately aligned in odd rows (the 1st row, the 3rd row, and so on), as shown in FIG. 4. In this arrangement, when row scanning for two rows is performed as described above, full color information can be obtained from signals read from pixels in the two rows, while all the signals (R signals) of the pixels provided with R filters are read by the 0th column-scanning circuit 20-0 and output from the 0th noise control circuit 18-0 and all the signals (B signals) of the pixels provided with B filters are read by the 1st column-scanning circuit 20-1 and output from the 1st noise control circuit 18-1.

Due to dimensional variations caused by manufacturing errors, a signal reading path via the 0th noise control circuit 18-0 and a signal reading path via the 1st noise control circuit 18-1 do necessarily have the same offset. However, by arranging the color filters as described above, R signals and B signals are always output via corresponding particular signal reading paths. Thus, the influence of offsets is easily eliminated. Although primary-color filters are used in the specific example, when complementary-color filters are used with a similar color filter arrangement, signals of all the pixels provided with a filter in a particular color can be read only by a particular column-scanning circuit from among two column-scanning circuits.

A second row-scanning procedure is described next. In the second row-scanning procedure, row scanning for even rows (the 0th row, the 2nd row, and so on) of the pixel array 14 is performed regarding the even rows as one row group, and row scanning for odd rows (the 1st row, the 3rd row, and so on) of the pixel array 14 is performed, separately from the row scanning for the even rows, regarding the odd rows as the other row group. In this procedure, if row scanning for even rows and row scanning for odd rows are performed in complete synchronization with each other, the same row scanning as in the first row-scanning procedure can be performed. However, the second row-scanning procedure has considerably more flexibility compared with the first row-scanning procedure. In addition, as described below, various operations can be achieved.

FIG. 5 is a block diagram showing a second example of the structure of the row-selection control unit 16 for performing the second row-scanning procedure used in the image sensor 10 shown in FIG. 1. As shown in FIG. 5, the row-selection control unit 16 includes two independent row-scanning circuits, that is, a 0th row-scanning circuit 54-0 and a 1st row-scanning circuit 54-1. Output lines of the 0th row-scanning circuit 54-0 are connected to row-scanning lines in even rows, that is, the 0th row-selection line HL0, the 2nd row-selection line HL2, and so on. Output lines of the 1st row-scanning circuit 54-1 are connected to row-scanning lines in odd rows, that is, the 1st row-selection line HL1, the 3rd row-selection line HL3, and so on. With this structure, a row-selection control unit capable of performing the second row-scanning procedure can be achieved. The 0th row-scanning circuit 54-0 and the 1st row-scanning circuit 54-1 themselves may be similar to a row-scanning circuit used in normal image sensors.

Figures 6, 7:
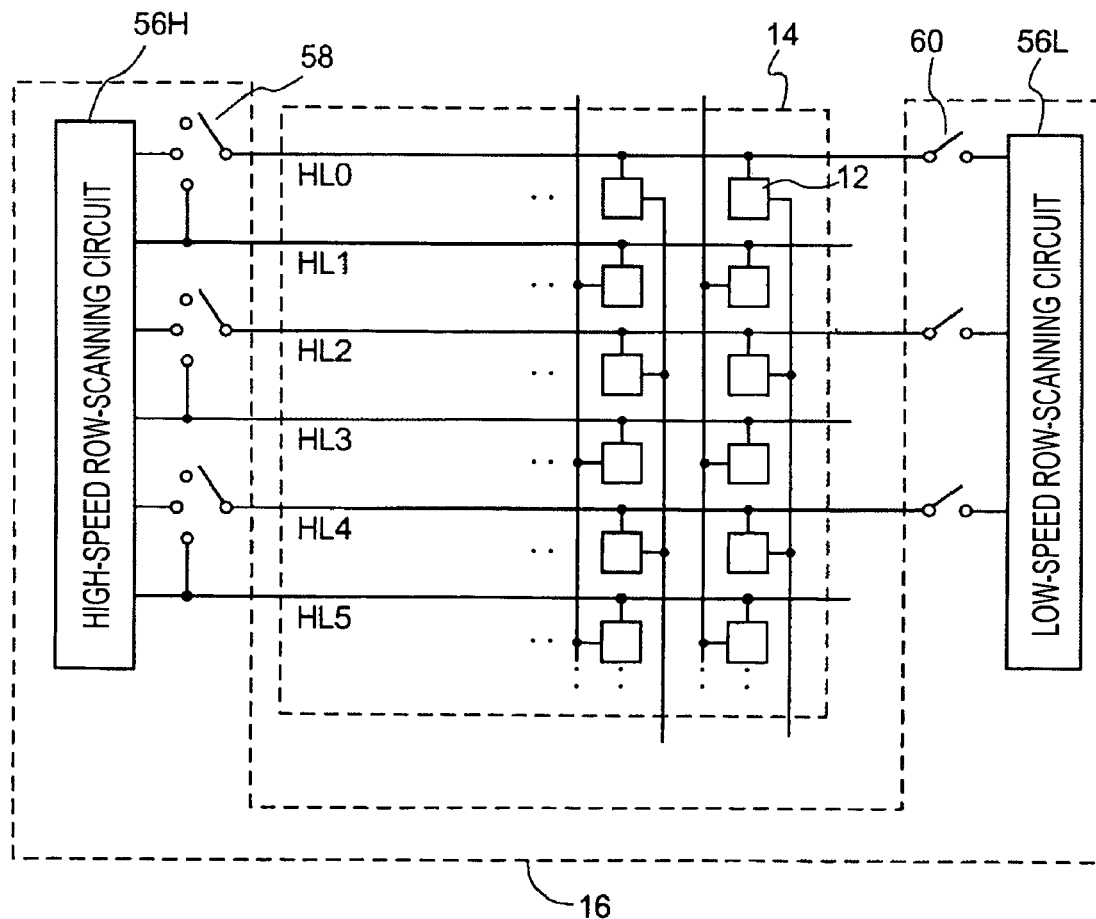
FIG. 6 is a schematic diagram showing a specific example of a preferred arrangement of color filters when the row-selection control unit shown in FIG. 5 is used.
FIG. 7 is a block diagram showing a third example of the structure of the row-selection control unit used in the CMOS color image sensor shown in FIG. 1.

FIG. 6 is a schematic diagram showing a specific example of a preferred arrangement of color filters when the row-selection control unit 16 shown in FIG. 5 adopting the second row-scanning procedure is used. As described above, each of the pixels 12 includes a red (R), blue (B), or green (G) color filter. In this example, the color filters in three colors are arranged such that a G, R, G, and B pattern is repeated in the 0th row, that an R, G, B, and G pattern is repeated in the 1st row, that a G, B, G, and R pattern is repeated in the 2nd row, and that a B, G, R, and G pattern is repeated in the 3rd row. The same pattern as in the 0th row is repeated in the 4th row, and similar patterns are repeated in the subsequent rows. With this color filter arrangement, since each row has all three color filters, full-color information can be obtained from signals read from the pixels 12 in a row of the pixel array 14. In addition, when complementary-color filters are used, the same advantage can be achieved by a similar color filter arrangement.

With the structure of the row-selection control unit 16 shown in FIG. 5 and the arrangement of the color filters shown in FIG. 6, the 0th row-scanning circuit 54-0 and the 1st row-scanning circuit 54-1 can be operated completely independently from each other without any restriction. In addition, with the foregoing structure and arrangement, it is preferable that the 0th column-scanning circuit 20-0 and the 1st column-scanning circuit 20-1 be operable independently from each other. In this case, an even row group and an odd row group of the pixel array 14 can be completely independent from each other. Furthermore, signal processing, such as color interpolation, on signals read from pixels in the even row group to generate a color image and signal processing, such as color interpolation, on signals read from pixels in the odd row group to generate a color image can be performed completely independently from each other.

Thus, various useful operations can be achieved. Since the interval between the time of starting a reading operation for a frame constituted by pixels in an even row group and the time of starting a reading operation for a frame constituted by pixels in an odd row group can be set, the interval can be minimized to be substantially infinitesimal. Accordingly, the frame reading speed (frame rate) can be momentarily increased. Thus, for example, if a sensor for detecting the moment when an object flying at high speed enters the field of view of the image sensor is used, the moment the object enters the field of view of the image sensor, the reading operation of the frame constituted by the pixels in the even row group is triggered, and without a pause, the reading operation of the frame constituted by the pixels in the odd row group is triggered. Accordingly, the speed and direction of the ultra-high-speed movement of the object can be detected.

In addition, a pixel scanning area, decimation of pixel signals, signal processing, and the like can be made different between signals read from the pixels in the even row group and signals read from the pixels in the odd row group. In addition, signals having such differences can be output from the 0th noise control circuit 18-0 and the 1st noise control circuit 18-1 at the same time. In addition, a difference between signals output at the same time can be calculated in real time. Thus, a solid-state image pickup device according to the present invention can be used for a wider range of applications.

The row-selection control unit 16 may have other structures, in addition to the structures shown in FIGS. 3 and 5. FIG. 7 is a block diagram showing a third example of the structure of the row-selection control unit 16 used in the image sensor 10 shown in FIG. 1. For example, as shown in FIG. 7, the row-selection control unit 16 includes a high-speed row-scanning circuit 56H having a high row rate and a low-speed row-scanning circuit 56L whose row rate is half that of the high-speed row-scanning circuit 56H. Using a three-position switch 58, each of the 0th row-selection line HL0, the 2nd row-selection line HL2, and so on in a 2k-th row (k is a positive integer), which is an even row, can be selectively connected to a 2k-th output line of the high-speed row-scanning circuit 56H, connected to a (2k+1)th output line of the high-speed row-scanning circuit 56H, and disconnected. In addition, using an on-off switch 60, each of the 0th row-selection line HL0, the 2nd row-selection line HL2, and so on in the 2k-th row can be selectively connected to a 2k-th output line of the low-speed row-scanning circuit 56L. Each of the 1st row-selection line HL1, the 3rd row-selection line HL3, and so on in a (2k+1)th row, which is an odd row, is connected to a (2k+1)th output line of the high-speed row scanning circuit 56H.

When a row-selection line in a 2k-th row, which is an even row, is connected, using the three-position switch 58, to a (2k+1)th output line of the high-speed row-scanning circuit 56H and the on-off switch 60 is turned off, the row-selection line in the 2k-th row, which is an even row, is connected to the row-selection line in the (2k+1)th row, which is an odd row. In this case, the same structure as in FIG. 3 is realized. When disconnection is selected by the three-position switch 58 and the on-off switch 60 is turned on, the same structure as in FIG. 5 is realized. In addition, when a row-scanning line in a 2k-th row, which is an even row, is connected, using the three-position switch 58, to a 2k-th output line of the high-speed row-scanning circuit 56H and the on-off switch 60 is turned off, scanning of all the rows can be performed by the high-speed row-scanning circuit 56H. The row-selection control unit 16 may have other structures.

Figure 8:
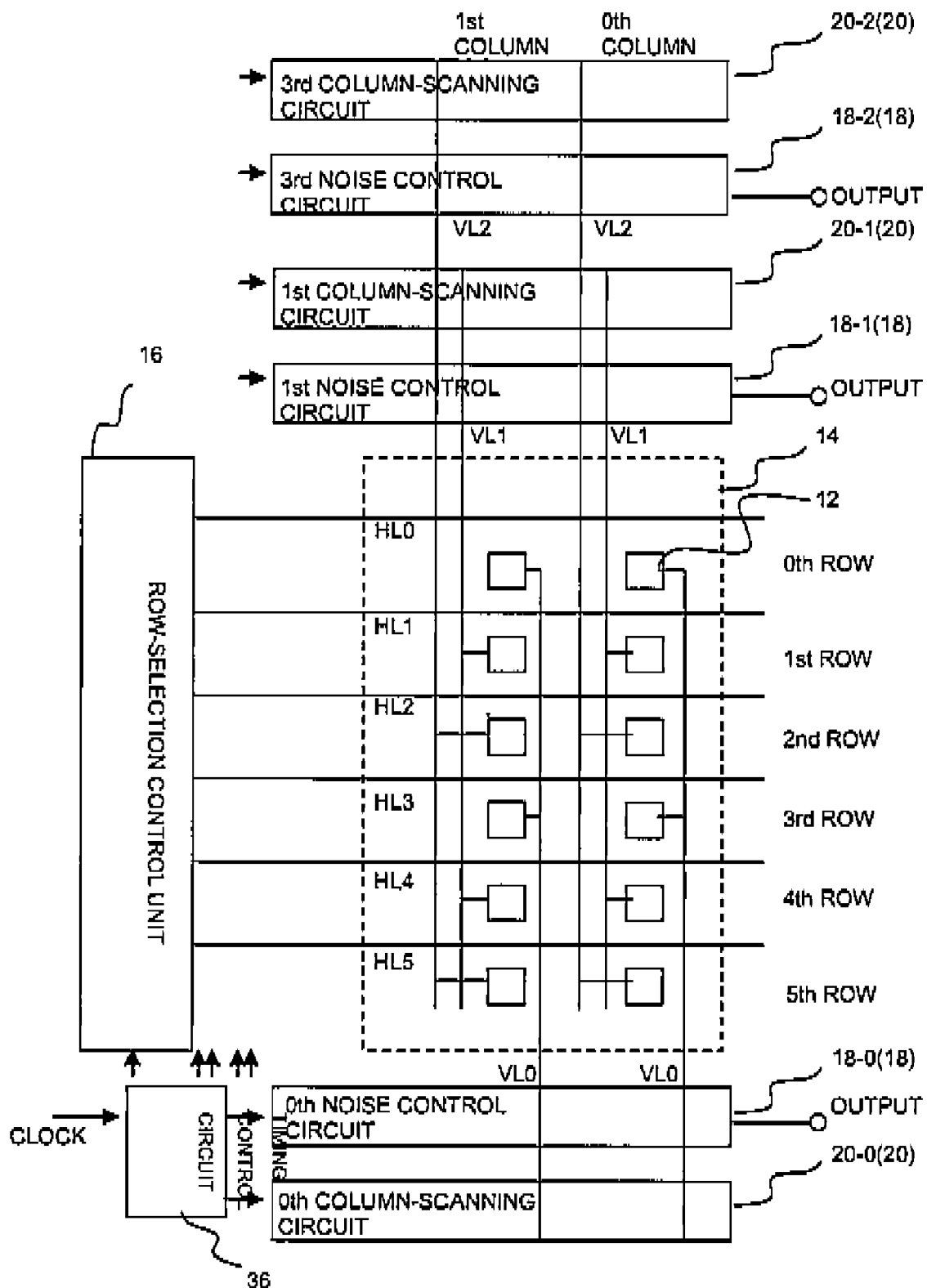
FIG. 8 is a block diagram showing an example of the structure showing three column reading lines.

Although a case where two column-reading lines are provided for each column of the pixel array 14 has been described, the present invention is not limited to this. As shown in FIG. 8, the number of column-reading lines provided for each column of the pixel array 14 may be three or more. For example, FIG. 8 shows three column scanning circuits, namely, a 0th column scanning circuit 20-0, a first column-scanning circuit 20-1 and a second column scanning circuit 20-2. This figure also shows three noise control circuits, namely, a $0^{th}$ noise control circuit 18-0, a first noise control circuit 18-1 and a second noise control circuit 18-2. Thus, in a solid-state image pickup device according to the present invention, n column-reading lines from a 0th column-reading line to an (n−1)th column-reading line are provided for each column of the pixel array 14, where n is ≧3.

In this case, each of the pixels 12 in each column of the pixel array 14 is connected to one of the n column-reading lines that correspond to the column. In addition, a pixel in a (k+m)th row of each column is connected to an mth column-reading line, where k represents a positive integer and m represents an integer from 0 to n−1. In addition, the column scanning unit 20 includes n column-scanning circuits from a 0th column-scanning circuit to an (n−1)th column- scanning circuit, and an mth column-reading line, from among the n column-reading lines for each column of the pixel array 14, is connected to an mth column-scanning circuit, where m represents an integer from 0 to n−1.

Also, the column-scanning unit of the present invention may indirectly select the plurality of column-reading lines. For example, the column-scanning unit may be connected to a signal processing unit on each of the column-reading lines and select the signal processing unit to read out signals from the pixels on the column-reading line.

With respect to the structure shown in FIG. 3, the row-selection control unit 16 includes a row-scanning circuit that activates n row-selection lines at the same time and that performs row scanning of the pixel array 14, and signals of pixels in n rows corresponding to the n row-selection lines activated at the same time are read in parallel by n column-scanning circuits.

With respect to the structure shown in FIG. 5, the row-selection control unit 16 includes n row-scanning circuits from a 0th row-scanning circuit to an (n−1)th row-scanning circuit, and a row-selection line in a (k+m)th row of the pixel array 14 is connected to an mth row-scanning circuit, where k represents a positive integer and m represents an integer from 0 to n−1.

As is easily understood, the advantage of the present invention increases as the number of column-scanning lines provided for each column of the pixel array 14 increases. In other words, a two-times-faster frame reading speed can be achieved when n=2, and a three-times-faster frame reading speed can be achieved when n=3. Accordingly, the speed can be increased in accordance with an increase in the number n. Although a temporary increase in the frame rate can be achieved only between two consecutive frames when n=2, a temporary increase in the frame rate can be achieved between three consecutive frames when n=3. In addition, in accordance with an increase in the number n, the number of frames that are read at the same time in parallel is increased. Thus, various types of signal processing can be achieved.

What is claimed is:

1. A solid-state image pickup device comprising:
   a pixel array including a plurality of pixels arranged in a matrix having a plurality of rows and a plurality of columns, each of the plurality of pixels converting an incident light intensity into an electrical signal;
   a plurality of row-selection lines, one row-selection line provided for each row of the pixel array and each connected to all of the pixels in the corresponding row;
   a row-selection control unit including two independent row scanning circuits, the row-selection control unit configured to selectively activate the plurality of row-selection lines;
   at least three column-reading lines, with n column-reading lines from a 0th column-reading line to an (n−1)th column-reading line being provided for each column of the pixel array, where n is >3; and
   a column-scanning unit, the column-scanning unit configured to selectively activate the plurality of column-reading lines, wherein, each of the plurality of pixels in each column of the pixel array is connected to one of the n column-reading lines that correspond to the column, a pixel in a (k+m)th row of each column is connected to an mth column-reading line, where k represents a positive integer and m represents an integer from 0 to (n−1), the column-scanning unit includes n column-scanning circuits from a 0th column-scanning circuit to an (n−1)th column-scanning circuit, and an mth column-reading line from among the n column-reading lines that correspond to each column of the pixel array is connected to an mth column-scanning circuit, where m represents an integer from 0 to (n−1).

2. The solid-state image pickup device according to claim 1, wherein:

the row-scanning circuits activate n row-selection lines at the same time and for performing row scanning of the pixel array; and signals of pixels in n rows corresponding to the n row-selection lines activated at the same time are read in parallel by the n column-scanning circuits.

3. The solid-state image pickup device according to claim 2, wherein:

the solid-state image pickup device is a color image sensor;

each of the plurality of pixels includes a color filter in one of a plurality of predetermined colors;

the color filters in the plurality of predetermined colors are arranged such that full color information is obtained from the signals read from the pixels in the n rows corresponding to the n row-selection lines activated at the same time; and signals of all the pixels provided with at least a color filter in a particular color from among the color filters in the plurality of predetermined colors are read only by a particular column-scanning circuit from among the n column-scanning circuits.

4. The solid-state image pickup device according to claim 1, wherein:

the row-selection control unit includes n row-scanning circuits from a 0th row-scanning circuit to an (n−1)th row-scanning circuit; and a row-selection line corresponding to a (k+m)th row of the pixel array is connected to an mth row-scanning circuit, where k represents a positive integer and m represents an integer from 0 to n−1.

5. The solid-state image pickup device according to claim 4, wherein:

the solid-state image pickup device is a color image sensor;

each of the plurality of pixels includes a color filter in one of a plurality of predetermined colors; and the color filters in the plurality of predetermined colors are arranged such that full color information is obtained from signals read from pixels in a row of the pixel array.

6. The solid-state image pickup device according to claim 5, wherein:

the n column-scanning circuits are operable independently from each other; and the n row-scanning circuits are operable independently from each other.

7. A solid-state image pickup device comprising:

a plurality of pixels arranged in a matrix having a plurality of rows and a plurality of columns, each of the plurality of pixels converting an incident light intensity into an electrical signal;

a plurality of row-selection lines, one row-selection line provided for each row of the pixel array and each connected to all of the pixels in the corresponding row;

a row-selection control unit including two independent row scanning circuits, the row-selection unit configured to selectively activate the plurality of row-selection lines;

at least three column-reading lines, with n column-reading lines from a 0th column-reading line to an (n−1)th column-reading line being provided for each column of the pixel array, where n is >3; and a column-scanning unit, the column-scanning unit configured to selectively activate the plurality of column-reading lines, wherein, each of the plurality of pixels in each column of the pixel array is connected to one of the n column-reading lines that correspond to the column, a pixel in a (k+m)th row of each column is connected to an mth column-reading line, where k represents an integer of {0, n, 2n, 3n, ...} and m represents an integer from 0 to (n−1), the column-scanning unit includes n column-scanning circuits from a 0th column-scanning circuit to an (n−1)th column-scanning circuit, and an mth column-reading line from among the n column-reading lines that correspond to each column of the pixel array is connected to an mth column-scanning circuit, where m represents an integer from 0 to (n−1).

* * * * *